(12) United States Patent
Soga

(10) Patent No.: US 6,965,944 B1
(45) Date of Patent: Nov. 15, 2005

(54) METHOD FOR DESIGNING TREE-STRUCTURED COMMUNICATION ROUTES AND TREE-STRUCTURE SOLUTION OF COMMUNICATION ROUTES

(75) Inventor: Kenji Soga, Tokyo (JP)

(73) Assignee: NEC Corporation, Tokyo (JP)

( * ) Notice: Subject to any disclaimer, the term of this patent is extended or adjusted under 35 U.S.C. 154(b) by 730 days.

(21) Appl. No.: 09/689,902

(22) Filed: Oct. 13, 2000

(30) Foreign Application Priority Data

Oct. 14, 1999 (JP) .................................. 11-292131

(51) Int. Cl.[7] ......................................... G06F 15/173
(52) U.S. Cl. ..................................................... 709/238
(58) Field of Search ................................ 709/238–242

(56) References Cited

U.S. PATENT DOCUMENTS

| | | | | |
|---|---|---|---|---|
| 4,466,060 A | * | 8/1984 | Riddle | ........................ 709/242 |
| 4,873,517 A | * | 10/1989 | Baratz et al. | ................ 370/236 |
| 4,967,345 A | * | 10/1990 | Clarke et al. | ................ 709/241 |
| 5,321,815 A | * | 6/1994 | Bartolanzo, Jr. et al. | ... 709/241 |
| 5,561,790 A | * | 10/1996 | Fusaro | ........................ 703/26 |
| 5,606,669 A | * | 2/1997 | Bertin et al. | ................ 709/223 |
| 6,282,170 B1 | * | 8/2001 | Bentall et al. | ............... 370/225 |
| 6,415,312 B1 | * | 7/2002 | Boivie | ......................... 709/200 |
| 6,584,071 B1 | * | 6/2003 | Kodialam et al. | .......... 370/238 |
| 6,748,433 B1 | * | 6/2004 | Yaakov | ....................... 709/224 |

FOREIGN PATENT DOCUMENTS

| | | |
|---|---|---|
| JP | A 3-230232 | 10/1991 |
| JP | A 6-62029 | 3/1994 |
| JP | A 6-112938 | 4/1994 |
| JP | A 6-152593 | 5/1994 |
| JP | A 8-242226 | 9/1996 |
| JP | A 9-284274 | 10/1997 |
| JP | A 2000-261476 | 9/2000 |
| JP | A 2001-24684 | 1/2001 |
| JP | A 2001-36574 | 2/2001 |
| WO | WO 98/18239 | 4/1998 |

* cited by examiner

*Primary Examiner*—Valencia Martin-Wallace
*Assistant Examiner*—Thomas Duong
(74) *Attorney, Agent, or Firm*—Young & Thompson

(57) ABSTRACT

A method for designing tree-structured communication routes includes adding a predetermined point to a score of a route successively selected from the plural routes, selecting the routes in reverse order of the scores of the routes, generating trees from the route with the lowest score and the other routes, and generating other trees from the routes which are unable to generate the trees, the predetermined point being added when any node in a selected route does not appear on the other route except the egress node, and when there is a node which appears in both the selected and other routes and the selected route agrees with the other route from the node to the egress node.

5 Claims, 4 Drawing Sheets

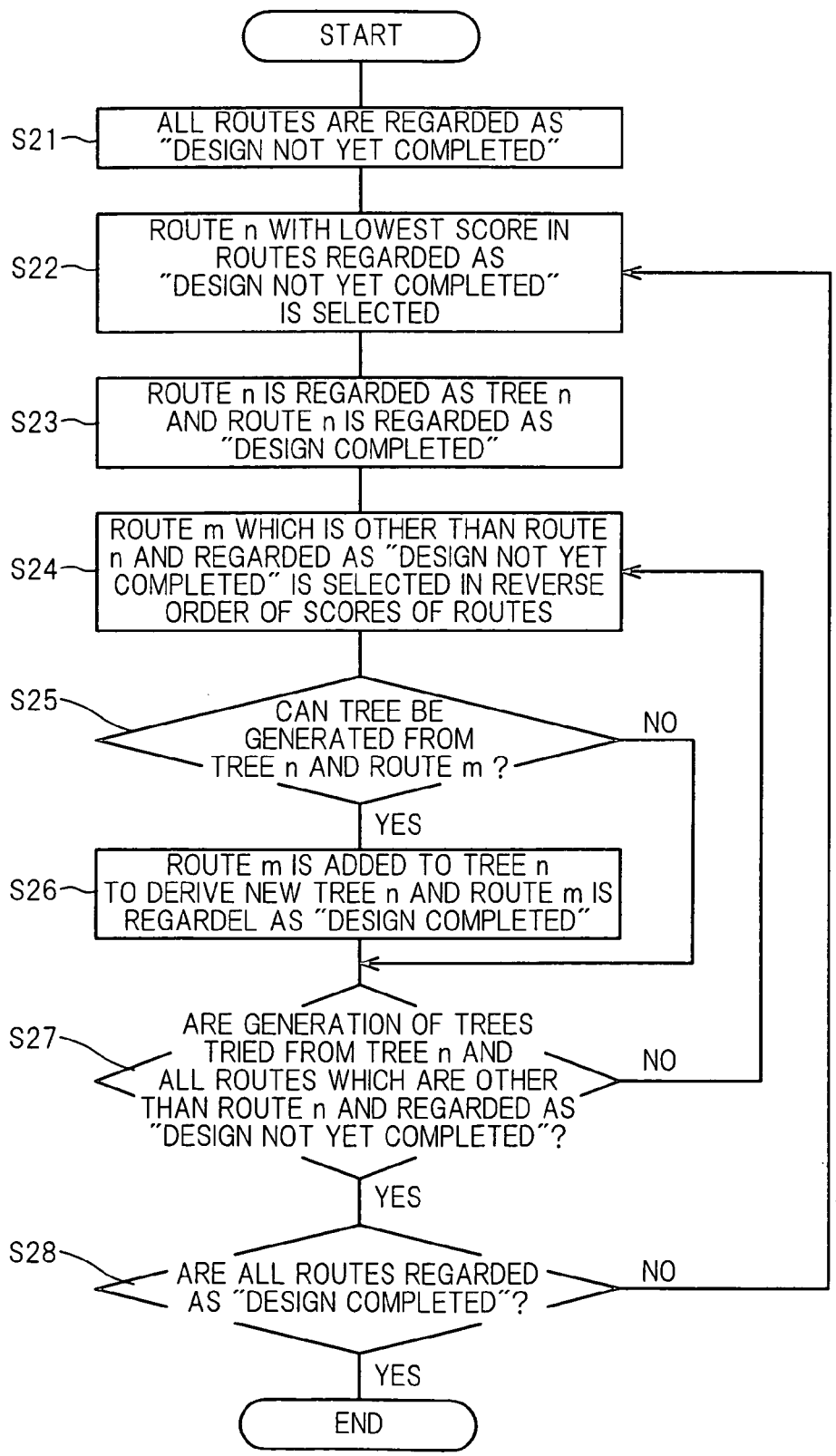

US 6,965,944 B1

METHOD FOR DESIGNING TREE-STRUCTURED COMMUNICATION ROUTES AND TREE-STRUCTURE SOLUTION OF COMMUNICATION ROUTES

FIELD OF THE INVENTION

The invention relates to a method for designing tree-structured communication routes and a tree-structure solution of communication routes, and especially to a method for heuristically designing tree-structured communication routes which quickly derives a solution for maintaining the number of input nodes large and keeping down the number of trees generated therein, and a tree-structure solution of communication routes derived by means of the aforementioned method.

BACKGROUND OF THE INVENTION

Trees are made up by given communication routes. The communication routes comprise many nodes. The tree is formed as a set of branches connected with the many nodes. A problem that the plural routes connected with the plural ingress nodes is given to a certain egress node and the number of the trees is minimized is solved by means of the mixed-integer program. The mixed-integer program gives the optimum solution certainly.

When the scale of the problem becomes large and the numbers of the given routes and the given trees become large, it is inevitable that a time necessary for deriving the optimum solution becomes extremely long. Accordingly, it is desirable to quickly derive an approximate solution which keeps down the number of the trees, even if the optimum solution is not necessarily obtained and the number of the trees is not minimized.

SUMMARY OF THE INVENTION

Accordingly, it is an object of the invention to provide a method for designing tree-structured communication routes for quickly deriving a solution which keeps down the number of the trees, even if the optimum solutions is not necessarily obtained and the number of the trees is not minimized, and to provide a tree-structure solution of the communication routes.

It is a further object of the invention to provide a method for designing tree-structured communication routes for quickly deriving a solution which keeps down the number of the trees, even if the optimum solution is not necessarily obtained and the number of the trees is not minimized, and renews the tree simply when a new route is added thereto, and to provide a tree-structure solution of the communication routes.

Means for realizing the objects of the invention is expressed as follows. Technical items in the following descriptions are enclosed by parentheses, and numerals and signs, etc. are added thereto. The numerals, signs, etc. agree with those added to the technical items constituting plural embodiments of the invention or at least one of them, and especially with those added to the technical items shown in drawings corresponding to the embodiments of the invention. Although these reference numerals and reference signs clarifies mediations between the technical items in claims and those shown in the embodiments, the mediations never mean that the technical items written in the claims are interpreted so as to be restricted to those of the embodiments.

According to the first feature of the invention, a method for designing tree-structured communication routes, in which plural ingress nodes ($E_1$ to $E_i$), a single egress node ($E_s$:$s=1$ to $i$), plural connection nodes ($C_1$ to $C_j$) situated between the plural ingress nodes ($E_1$ to $E_i$) and the single egress node ($E_s$), and plural routes starting from the plural ingress nodes ($E_1$ to $E_i$) to the single egress node ($E_s$) via the plural connection nodes ($C_1$ to $C_j$) are given, comprises the steps of:

adding a predetermined point to a score of a route successively selected from the plural routes, successively selecting the routes in reverse order of the scores of the routes, respectively generating trees from the route with the lowest score and the other routes, and successively generating other trees from the routes which are unable to generate the trees, wherein the step of adding the predetermined point to the score of the selected route is carried out whenever either of (1) the first condition that any node in a selected route does not appear on the other route except the egress node, or (2) the second condition that, when there is a node which appears in both the selected and other routes, the selected route agrees with the other route from the node to the egress node, is satisfied.

The trees for accommodating all the route can be generated certainly in accordance with the aforementioned way of scoring, and even if the generated trees are not optimized and the number of the trees is not minimized, generation of the tree can be heuristically conducted at a high speed. Advantage of this method is that, even when a new route is added to the tree-structure once constructed, the tree can be again generated. Even when the route is replaced with a tree, the method according to the invention can be still applied thereto. From this point of view, the route may be regarded as the tree, hence the route may be regarded as the route or the tree. It is advisable that a point added to the score of the route is +1 point simply and uniformly.

A tree-structure solution according to the invention is a tree-structure solution derived by means of the aforementioned method for designing the tree-structured communication routes. The tree-structure solution of the communication routes can be recorded in a recording medium so as to be read by a computer.

BRIEF DESCRIPTION OF THE DRAWINGS

The invention will be explained in more detail in conjunction with the appended drawings, wherein:

FIG. 5 is a flow chart for showing a method for generating trees in a method for designing tree-structured communication routes according to the invention.

DESCRIPTION OF THE PREFERRED EMBODIMENTS

Figure 1:
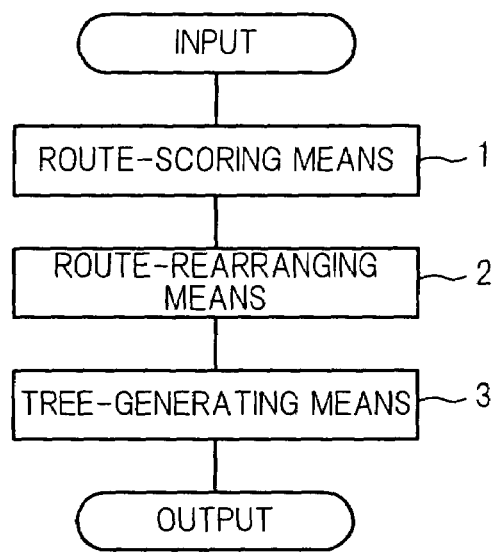
FIG. 1 is a flow chart for showing an embodiment of a method for designing a tree-structured communication routes according to the invention.

As shown in FIG. 1, an embodiment of the method for designing tree-structured communication routes is composed of a route-scoring means 1 for adding a predetermined point to a score of each route and keeping the score as mentioned later, a route rearranging means 2 for rearranging the routes in accordance with the scores thereof, and a tree-generating means 3 for successively generating trees from the rearranged routes.

The route-scoring means 1 is connected with the route-rearranging means 2, and the route-rearranging means 2 is connected with the tree-generating means 3. The tree-generating means operates in accordance with a program describing a solution which keeps down the number of the trees of the given routes and outputs a tree-structure solution at a high speed, and is provided with a recording medium for storing the aforementioned program. The program stored in the recording medium can be read by a computer selected at will.

Figure 2:
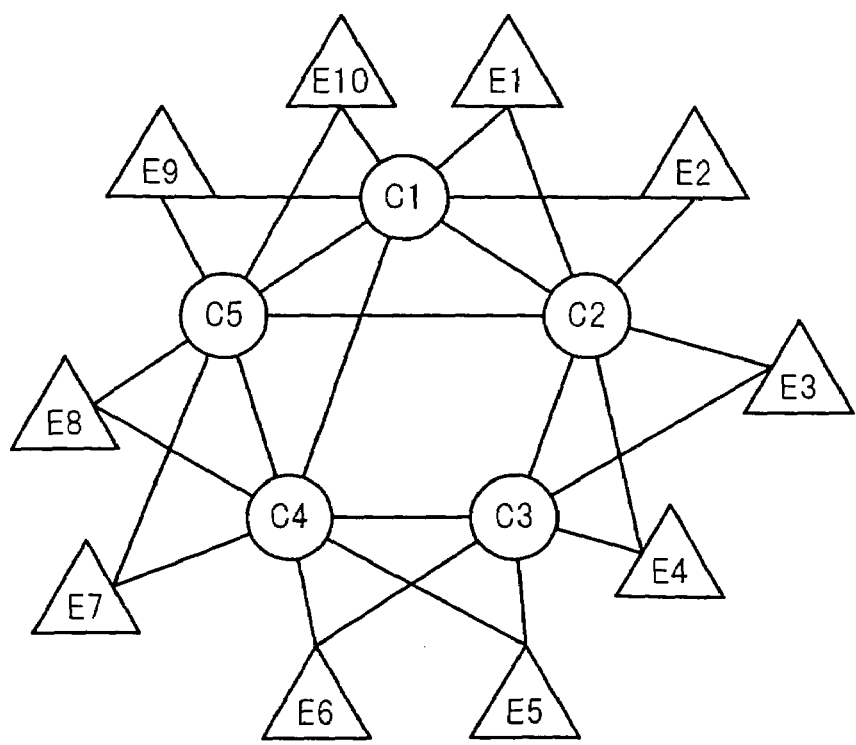
FIG. 2 is a diagram for showing a tree-structured communication routes.

FIG. 2 exemplifies communication routes to which the method for designing the communication routes according to the invention is applied to derive a tree-structure solution. Ingress or egress nodes are denoted by E1, E2, ..., E10 and connection nodes are denoted by C1, C2, ..., C5. The six routes mentioned as follows are extracted as a subset of the routes. The six routes is provided with the same egress node E1.

Route 1: E3-C2-E1
Route 2: E3-C3-C4-C1-E1
Route 3: E5-C3-C2-E1
Route 4: E5-C4-C1-E1
Route 5: E7-C4-C3-C2-E1
Route 6: E7-C5-C1-E1

Figure 3:
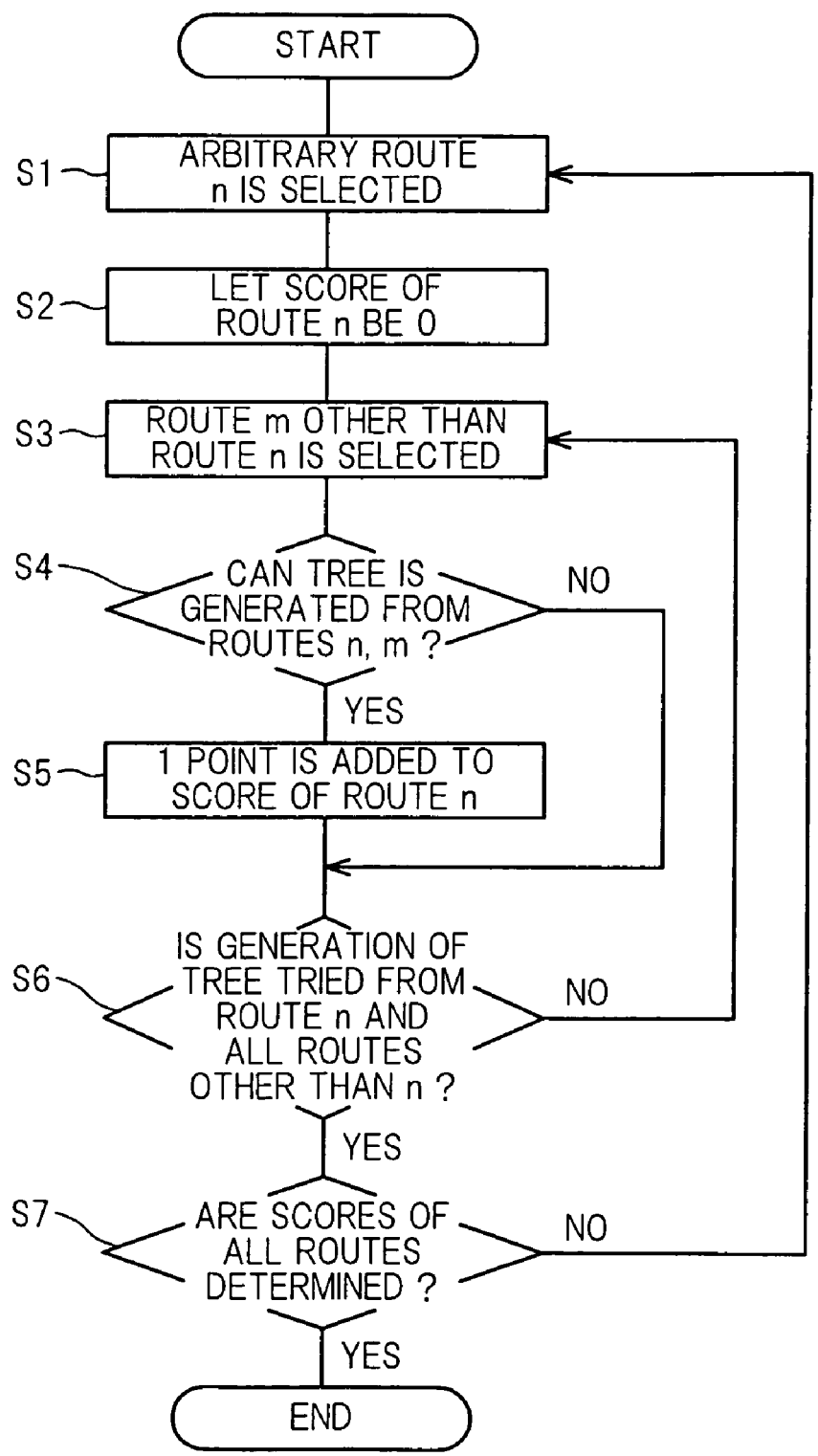
FIG. 3 is a flow chart for showing a method for calculating a score of a route in a tree-structured communication routes according to the invention.

FIG. 3 shows a method for scoring the route, which is a portion of the tree-structure solution. In Step 1, a route n is selected as an arbitrary one of the six routes. A score of the route n is initialed at Step S2, and set to be 0. Next, a route m other than the route n is selected (Step S3). Then, whether a tree can be generated or not from the routes n, m is judged. Both the end points of the route are denoted by E, and a point inserted between both the end points is denoted by C. Hereinafter, the node and the end point are used without distinction.

Whether the tree can be generated or not is judged on the basis of the rules mentioned as follows.

(1) If there is not a node, other than the egress node, which commonly appears in a route/tree A and a route/tree B, the tree can be generated from the route/tree A and the route/tree B.

(2) In case that there is a node which commonly appears in the route/tree A and the route/tree B, if the other node connected with the aforementioned common node appears in the route/tree A and the route/tree B commonly, the tree can be generated; and if not so, the tree cannot be generated.

The aforementioned criterions can be rewritten as follows.

(1) If any node in a route/tree A does not appear in a route/tree B except the egress node, a tree can be generated from the route/tree A and the route/tree B.

(2) In case that there is a node which appears in both the route/tree A and the route/tree B, if the route/tree A agrees with the route/tree B from the node to the egress node, the tree can be generated from the route/tree A and the route/tree B; and if not so, the tree cannot be generated from the route/tree A and the route/tree B.

Figure 4:
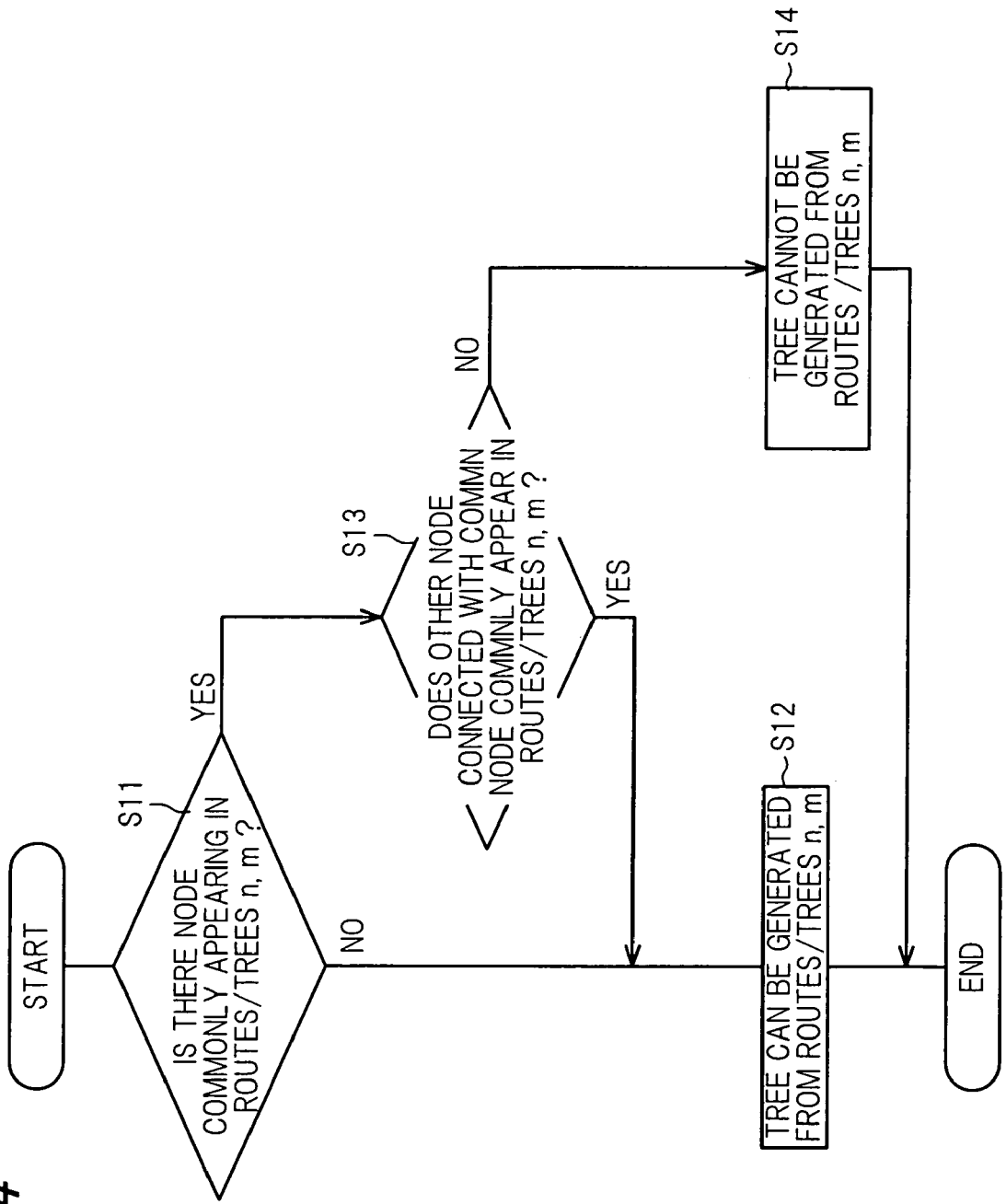
FIG. 4 is a flow chart for showing a method for judging whether generation of a tree is possible or not in a method for designing a tree-structured communication routes.

FIG. 4 shows a method for judging whether the tree can be generated or not in the aforementioned case. Whether there is a node, other than the egress node, commonly appearing in the route/tree n and the route/tree m or not is judged at Step S11. If there is not a common node, it is judged that a tree can be generated from the route/tree n and the route/tree m (Step S12). If there is a node commonly appearing in the route/tree n and the route/tree m, whether the other node connected with the aforementioned common node commonly appears in the route/tree n and the route/tree m or not is judged. If there is such a common node which is connected with the aforementioned common node, the process is shifted to Step S12, and it is judged that the tree can be generated. If there is not such a common node which is connected with the aforementioned common node, it is judged that generation of the tree is impossible (Step S14).

Whether the tree can be generated from the route n and the route m or not is judged at Step S4 in accordance with the criterion mentioned in the above. When generation of the tree is possible, one point is added to the score of the route n (Step S5). The score of the route n is given as 0+1=1 (point). When generation of the tree is possible, 1 point is added to the score of the route n, and when generation of the tree is impossible, no point is added to the sore of the route n and the process advances to Step 6.

Since all the routes other than the route n has not been selected yet in Step S6, the process returns to Step S3. In Step S3, a route s (s=3, for instance) is selected, wherein the route s is different from the route m (m=2, for instance) formerly selected and from the route n (n=1, for instance). Steps S4 to S5 are repeated with respect to the route s, and one point is added to the score of the route s, when the tree can be generated. When whether the tree can be generated or not from the route n and all the routes other than n are respectively judged, the aforementioned calculations are conducted and the total score of the route n related to all the routes other than n are determined (Step S7), the process returns to Step S1, and a route k other than the route n is selected. Then, the aforementioned steps are repeated with respect to the route k, and the calculation of the total score of the route k related to all the routes other than the route k is conducted.

Explaining concretely, the node C3 appears in the routes 2, 3 commonly, the node C3 is connected with the node C4 in the route 2, and the node C3 is connected with the node C2 in the route 3. Accordingly, since there is no common node connected with the aforementioned common node C3 in the routes 2, 3, the tree cannot be generated from the routes 2, 3. Since the node C2 appears in the routes 1, 3 commonly and both the routes 1, 3 are connected with a common node the end point E1), the tree can be generated from the routes 1, 3.

As mentioned in the above, the scores of the routes are calculated in this way, and a score table can be made up as follows.

Route 1: E3-C2-E1: Score=4 points.
Route 2: E3-C3-C4-C1-E1: Score=2 points.
Route 3: E5-C3-C2-E1: Score=3 points.
Route 4: E5-C4-C1-E1: Score=3 points.
Route 5: E7-C4-C3-C2-E1: Score=2 points.
Route 6: E7-C5-C1-E1: Score=4 points.

The route-rearranging means rearranges these routes in reverse order of the scores.

Route 2: E3-C3-C4-C1-E1: Score=2 points.
Route 5: E7-C4-C3-C2-E1: Score=2 points.
Route 3: E5-C3-C2-E1: Score=3 points.
Route 4: E5-C4-C1-E1: Score=3 points.

Route 1: E3-C2-E1: Score=4 points.
Route 6: E7-C5-C1-E1: Score=4 points.

The tree-generating means 3 generates the trees in the order of the arrangement of the routes rearranged by the route-rearranging means 2. FIG. 5 shows the method for generating the trees. First, all the routes 1 to 6 are regarded as "design not yet completed" (Step S21). In the routes which are regarded as "design not yet completed", the route with the lowest score n (n=2, for instance) is selected (Step S22). The route n is regarded as a tree n formed only of the route n. The route/tree n is regarded as "design completed" (Step 23).

Next, the route m which is regarded as "design not yet completed" and has the second lowest score (m=5, for instance) is selected. Whether the tree can be generated from the tree n and the route m or not is judged in accordance with the aforementioned criterion (Step S25). If the tree can be generated from the tree n and the route m, the route m is added to the tree n to generate a new tree, which is newly regarded as the tree n.

In this case, when route m is added to tree n, the tree m is regarded as "design completed." (Step 26). On the basis of the judgment of Step S27, Steps S24 to S26 are repeatedly applied to all the routes which are other than the route n and regarded as "design not yet completed." Steps S24 to S26 are repeatedly applied to all the routes, and whether all the routes are regarded as "design completed" or not is judged (Step S28). If one or more routes which are regarded as "design not yet completed" still remain, Steps 22 to 27 are repeatedly applied.

The following results are obtained in the first trial steps.
Route 2: E3-C3-C4-C1-E1: Score=2 points: "design completed"
Route 5: E7-C4-C3-C2-E1: Score=2 points: "design not yet completed"
Route 3: E5-C3-C2-E1: Score=3 points: "design not yet completed"
Route 4: E5-C4-C1-E1: Score=3 points: "design completed"
Route 1: E3-C2-E1: Score=4 points: "design not yet completed"
Route 6: E7-C5-C1-E1: Score=4 points: "design completed"

As the result of the first trial steps, the tree 2 is composed of the routes 2, 4, 6.

Following results are obtained as the result of the second trial steps.
Route 2: E3-C3-C4-C1-E1: Score=2 points: "design completed"
Route 5: E7-C4-C3-C2-E1: Score=2 points: "design completed"
Route 3: E5-C3-C2-E1: Score=3 points: "design completed"
Route 4: E5-C4-C1-E1: Score=3 points: "design completed"
Route 1: E3-C2-E1: Score=4 points: "design completed"
Route 6: E7-C5-C1-E1: Score=4 points: "design completed"

As the result of the second trial steps, the tree 2 is composed of the routes 2, 4, 6, and the tree 5 is composed of the routes 5, 3, 1.

The method for generating the new trees mentioned in the above can be applied to a case where the routes and the trees are mixedly given as the input parameters as well as to a case where only the routes are given as input parameters by regarding the routes shown in FIGS. 3 and 5 as the trees. After the tree is once generated, a new tree can be further generated by adding a new route thereto.

According to the method for designing the tree-structured communication routes and the tree-structure solution of the communication routes according to the invention, the tree can be generated at a high speed. Moreover, a new tree can be generated by further adding a route to the tree once generated.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for designing tree-structured communication routes, in which plural ingress nodes, a single common egress node, plural connection nodes situated between said plural ingress nodes and said single common egress node, comprising the sequential steps of:

determining a set of plural routes starting from each of said plural ingress nodes, via said plural connection nodes, to said common egress node;

determining whether a first condition that any node, except said egress node, in a selected route successively selected from said set of plural routes, does not appear on another route, is satisfied, and when the first condition is satisfied, adding a predetermined point to a score of the route;

determining whether a second condition that, when there is a common node, in addition to said common egress node, which appears in both said selected route and said another route, and said selected route agrees with said another route from said common node to said common egress node, is satisfied, and when the second condition is satisfied, adding the predetermined point to the score of the route successively selected from said set of plural routes;

successively selecting said routes in reverse order of said scores of said routes;

respectively generating a first tree, extending from at least two of said plural ingress nodes to said common egress node, from said route with a lowest score and said other routes based on shared routings, along said route and said other routes, to the common egress node; and successively generating other trees, extending from at least one of said plural ingress nodes to said common egress node, from said other routes which are unable to generate said first tree, based on shared routings along said other routes to the common egress node.

2. The method for designing tree-structured communication route as defined in claim 1, wherein:

said predetermined point to be added to said score of said selected route is +1 point.

3. The method for designing tree-structured communication route as defined in claim 1, wherein:

said route is regarded as a route or a tree.

4. A tree-structure solution derived by means of a method for designing tree-structured communication routes, in which plural ingress nodes, a single egress node, plural connection nodes situated between said plural ingress nodes and said single egress node, and a set of plural routes starting from said plural ingress nodes to said single egress node via said plural connection nodes are given, comprising the steps of:

determining whether a first condition that any node, except said egress node, in a selected route successively selected from said set of plural routes, does not appear on another route, is satisfied and when the first condition is satisfied, adding a predetermined point to a score of the route successively selected from said set of plural routes, each of the routes starting with one of the ingress nodes and ending with the single egress node, determining whether a second condition that, when there is a common node, in addition to said egress node, which appears in both said selected and another routes, and said selected route agrees with said another route from said common node to said egress node, is satisfied and when the second condition is satisfied, adding the predetermined point to the score of the route, successively selecting said routes in reverse order of said scores of said routes, respectively generating a first tree from said route with a lowest score and said other routes based on shared routings, between said route and said other routes, to the single egress node, and successively generating other trees from said other routes which are unable to generate said trees based on shared routings, between the other trees, to the single egress node.

5. A recording medium recording a tree-structure solution derived by means of a method for designing tree-structured communication routes, in which plural ingress nodes, a single egress node, plural connection nodes situated between said plural ingress nodes and said single egress node, and a set of plural routes starting from said plural ingress nodes to said single egress node via said plural connection nodes are given, comprising the steps of:

determining whether a first condition that any node, except said egress node, in a selected route does not appear on another route, is satisfied and when the first condition is satisfied, adding a predetermined point to a score of the selected route successively selected from said set of plural routes, each of the routes starting with one of the ingress nodes and ending with the single egress node, determining whether a second condition that, when there is a common node which appears in both said selected and another routes, and said selected route agrees with said another route from said common node to said egress node, is satisfied and when the second condition is satisfied, adding the predetermined point to the score of the selected route, successively selecting said routes in reverse order of said scores of said routes, respectively generating a first tree from said route with a lowest score and said other routes based on shared routings, between said route and said other routes to the single egress node, and successively generating other trees from said other routes which are unable to generate said first tree, said other trees based on shared routings of the other routes to the common egress node, wherein said tree-structure solution can be read by a computer.

\* \* \* \* \*